United States Patent
Dzafic et al.

(10) Patent No.: US 9,618,085 B2
(45) Date of Patent: Apr. 11, 2017

(54) DUAL-CLUTCH SEVEN SPEED TRANSMISSION ARRANGEMENT FOR A HYBRID VEHICLE

(71) Applicant: VOLVO CAR CORPORATION, Gothenburg (SE)

(72) Inventors: Ahmet Christian Dzafic, Molndal (SE); Lennart Andersson, Savedalen (SE)

(73) Assignee: VOLVO CAR CORPORATION (SE)

( * ) Notice: Subject to any disclaimer, the term of this patent is extended or adjusted under 35 U.S.C. 154(b) by 141 days.

(21) Appl. No.: 14/559,313

(22) Filed: Dec. 3, 2014

(65) Prior Publication Data
US 2015/0159735 A1    Jun. 11, 2015

(30) Foreign Application Priority Data

Dec. 11, 2013    (EP) .................................... 13196655

(51) Int. Cl.
*F16H 3/08*    (2006.01)
*F16H 3/00*    (2006.01)
(Continued)

(52) U.S. Cl.
CPC ............... *F16H 3/006* (2013.01); *B60K 6/48* (2013.01); *B60K 6/547* (2013.01); *B60K 2006/4825* (2013.01); *B60K 2006/4833* (2013.01); *F16H 2003/0826* (2013.01); *F16H 2003/0931* (2013.01); *F16H 2200/0008* (2013.01); *F16H 2200/0056* (2013.01); *Y02T 10/6221* (2013.01);
(Continued)

(58) Field of Classification Search
CPC .. F16H 3/006; F16H 2003/0931; F16H 3/091; F16H 47/02
USPC .................................. 74/330, 331, 333, 340
See application file for complete search history.

(56) References Cited

U.S. PATENT DOCUMENTS 6,634,247 B2    10/2003    Pels
7,383,749 B2 *    6/2008    Schafer .................. F16H 3/006
                                                                74/330

(Continued)

FOREIGN PATENT DOCUMENTS

DE          10133695 A1    3/2002
EP          2383139 A1     11/2011
(Continued)

OTHER PUBLICATIONS

Extended European Search Report Dated Apr. 17, 2014, Application No. 13196655.8-1752, Applicant Volvo Car Corporation, 8 Pages.

*Primary Examiner* — Ha D Ho
(74) *Attorney, Agent, or Firm* — Brooks Kushman P.C.

(57) ABSTRACT

A dual-clutch seven speed transmission arrangement and method for use with a transverse engine arrangement in a hybrid vehicle are provided. The dual-clutch seven speed transmission arrangement includes a dual-clutch gearbox comprising an input shaft for odd drive gears and an input shaft for even drive gears, respectively arranged in connection to a first clutch and a second clutch. The input shaft for even drive gears is a hollow shaft enclosing the input shaft for odd drive gears and the input shaft for odd drive gears is arranged to host four odd drive gears. The input shaft for even drive gears is arranged to host three even drive gears and a reverse drive gear. An electric motor is connected to the input shaft for even drive gears.

15 Claims, 6 Drawing Sheets

(51) Int. Cl.
*B60K 6/48* (2007.10)
*B60K 6/547* (2007.10)
*F16H 3/093* (2006.01)

(52) U.S. Cl.
CPC ........ *Y02T 10/6252* (2013.01); *Y10S 903/919* (2013.01); *Y10T 74/19014* (2015.01)

(56) References Cited

U.S. PATENT DOCUMENTS

| | | | | |
|---|---|---|---|---|
| 8,297,141 | B2* | 10/2012 | Cimatti | B60K 6/48 74/330 |
| 8,522,635 | B2* | 9/2013 | Pastorello | B60K 6/48 74/330 |
| 8,915,159 | B2* | 12/2014 | Pregnolato | F16H 63/3416 74/330 |
| 9,003,905 | B1* | 4/2015 | Lee | F16H 3/093 74/330 |
| 9,145,951 | B2* | 9/2015 | Lee | F16H 3/006 |
| 9,145,952 | B2* | 9/2015 | Lee | F16H 3/12 |
| 2005/0139035 | A1* | 6/2005 | Lee | B60K 6/36 74/661 |
| 2007/0199393 | A1* | 8/2007 | Hattori | F16H 3/006 74/331 |
| 2007/0240530 | A1* | 10/2007 | Ogami | F16H 63/18 74/330 |

FOREIGN PATENT DOCUMENTS

| | | |
|---|---|---|
| EP | 2385270 A1 | 11/2011 |
| WO | 2013051640 A1 | 4/2013 |

* cited by examiner

DUAL-CLUTCH SEVEN SPEED TRANSMISSION ARRANGEMENT FOR A HYBRID VEHICLE

CROSS-REFERENCE TO RELATED APPLICATIONS

This application claims foreign priority benefits under 35 U.S.C. §119(a)-(d) to European patent application number EP 13196655.8, filed Dec. 11, 2013 which is incorporated by reference in its entirety.

TECHNICAL FIELD

The present disclosure relates generally to a compact dual-clutch seven speed transmission arrangement for a hybrid vehicle.

BACKGROUND

Hybrid vehicles, such as hybrid electric vehicles (HEV) or plugin-in hybrid electric vehicles (PHEV), typically comprise a drive train with a gearbox for allowing the vehicle to use different gears at different speeds. This practice is common both for hybrid vehicles and traditional vehicles, such as vehicles with single internal combustion engines.

Transmission arrangements for hybrid vehicles in difference from transmission arrangements for traditional vehicles need to be adapted for power input from multiple sources. In addition, hybrid vehicles are often produced to be energy efficient and thereby need to utilize energy efficient gearboxes.

In prior art it is well known to use dual-clutch transmissions for vehicles in order to decrease the time of gear changes and optimize fuel consumption in relation to use of traditional automatic gearboxes or manual gearboxes. The dual-clutch transmission can fundamentally be described as two manual gearboxes working as one unit while contained within a single housing. In general, dual-clutch gearboxes comprise a twin-clutch configuration creating a semi-automatic or fully-automatic gearbox that can prepare the next gear prior to a gear change by utilizing the two clutches in combination with two input shafts. Thereby the time required to switch into the next gear is minimized and fuel is saved. One further advantage with the dual-clutch transmission arrangement is that the hydraulic clutch associated with traditional automatic gearboxes can be removed. This is beneficial in relation to fuel saving.

The implementation of extra parts, such as the dual-clutch configuration, presents problems in relation to the size of the gearbox. This is a difficult problem especially for gearboxes with a high number of gears wherein it is desired to minimize the number of dependencies between the gears. Furthermore, transversal installation of internal combustion engines provides an even greater challenge regarding fitting all the necessary components within the confined space of an engine bay. Modern vehicles require strict safety standards which limit the space within engine bays even more due to structural reinforcements and deformation zones.

Hybrid vehicles are characterized by their multiple engines and/or drive sources that are used to power the vehicle. The addition of an extra engine presents even more difficulties in relation to the available space and the difficulties encountered when fitting all the components in a vehicle. For hybrid electric vehicles wherein an internal combustion engine is combined with an electrical engine, two different propulsion systems need to be connected to the transmission. This means that the drive train and gearbox need to be adapted to the requirements of different propulsion systems. This adds additional modifications to the drive train of such vehicles which increase the size of the transmission. It is thereby essential for hybrid vehicles to comprise compact transmissions in order to maintain the size of such vehicles.

The conventional design of dual-clutch transmission arrangements for use with transverse internal combustion engine arrangements comprises gearboxes with six or less gears excluding the reverse gear. Furthermore, the conventional designs depend on multiple dependencies between gears as well as gear configurations that might mix even and odd gears in ways that limits the gear ratio of the gearbox. It is for example common to arrange both the lowest and highest gears at the same output shaft in compact dual-clutch gearboxes which limits the gear ratio options available. For example, by comprising the entire range of gears in a gearbox at one single output shaft, that single output shaft has to be adapted to conform to both the highest and lowest gear ratio that is possible for the gearbox to deliver. This limits the available options and especially decreases the options of reducing the gearbox size due to the limitations in drive gear options.

Creation of compact gearboxes thereby presents additional problems to address in relation of how to distribute the gears within the gearbox without increasing the size of the gearbox housing. It is beneficial to achieve as high gear ratio ranges as possible by creating a gearbox where the gear ratio between the lowest and highest gear can be decided without limiting factors such as gear dependencies.

With the above problems and solutions in mind it would therefore be advantageous to provide a compact dual-clutch transmission arrangement for a transverse engine arrangement in a hybrid vehicle that decreases, or maintains, the size of the gearbox housing while providing sufficient options in relation to gear dependencies and gear ratio.

SUMMARY

An object of the present disclosure is to provide a dual-clutch seven speed transmission arrangement for use with a transverse internal combustion engine arrangement in a hybrid vehicle wherein an electric motor is connected to the even gears of the gearbox and the gears in the dual-clutch gearbox are arranged in a space saving manner.

Thus, the disclosure relates to a dual-clutch seven speed transmission arrangement for use with a transverse engine arrangement in a hybrid vehicle. A dual-clutch gearbox comprises an input shaft for odd drive gears and an input shaft for even drive gears, respectively arranged in connection to a first and a second clutch. The input shaft for even drive gears is a hollow shaft enclosing said input shaft for odd drive gears and the input shaft for odd drive gears is arranged to host four odd drive gears. The input shaft for even drive gears is further arranged to host three even drive gears and a reverse drive gear, and in connection to said input shaft for even drive gears is an electric motor arranged.

In a preferred embodiment of the disclosure the gears are divided between two input shafts each comprising different drive gears, wherein a first input shaft comprises drive gears for the odd gears and a second input shaft comprises drive gears for the even gears. The second input shaft that comprise the even drive gears is further in connection with an electric motor in order to enable hybrid propulsion of the vehicle.

In one embodiment of the dual-clutch seven speed transmission arrangement for use with a transverse engine arrangement in a hybrid vehicle, said input shaft for odd drive gears comprises drive gears for gear 1, 3, 5, and 7, and said input shaft for even drive gears comprises drive gears for gear 2, 4, 6, and reverse.

The distribution of the drive gears among the input shafts is important in relation to the size of the dual-clutch gearbox. The gear sets are arranged parallel with two gears on each side of the input shafts which allows for an improved utilization of dual output shafts.

In one embodiment of the dual-clutch seven speed transmission arrangement for use with a transverse engine arrangement in a hybrid vehicle, said transmission further comprises first and second output shafts, wherein said first output shaft comprises drive gears for gear 1, 3, 4, and reverse while said second output shaft comprises drive gears for gear 2, 5, 6, and 7.

Arranging dual output shafts provides options to further enhance the properties of dual-clutch gearboxes. It is for example common to arrange both the lowest and the highest gear at the same output shaft in conventional compact dual-clutch six speed gearboxes. However, such arrangements create limitations because they limit the gear ratio options available by arranging the entire gear ratio range at a single output shaft. This means that the gear ratio of one output shaft needs to cover the entire gear ratio range that the gearbox can provide, limiting the available options and especially decreasing the options of reducing the gearbox size. By dividing the gears between even and odd gears and further arranging dual output shafts it is possible to arrange the $1^{st}$ and $7^{th}$ gear at different output shafts providing possibilities for a larger ratio range in between.

In addition to arranging the $1^{st}$ and $7^{th}$ gear at different output shafts the specific arrangement of one embodiment of the disclosure where the three highest gears, 5, 6, and 7, are arranged at the same output shaft while three out of the four lowest gears are arranged at the other output shaft together with the reverse gear provides that the output shafts can be designed for different purposes. For example the output shafts in one embodiment of the disclosure could be designed so that one of the output shafts is a high gear ratio output shaft while the other is a low gear ratio output shaft.

In one embodiment of the dual-clutch seven speed transmission arrangement for use with a transverse engine arrangement in a hybrid vehicle, said dual-clutch gearbox comprises a single gear dependency between a $4^{th}$ and a $6^{th}$ drive gear.

The number of gears that are dependent in relation to other gears in a gearbox is one of the factors that limit the ratio range that is possible for a certain gearbox design. Multiple dependencies between gears present limitations by locking the gear ratio that can be used. By providing a solution with single gear dependency the gear ratio can be significantly increased.

In one embodiment of the dual-clutch seven speed transmission arrangement for use with a transverse engine arrangement in a hybrid vehicle, said dual-clutch gearbox comprises a single gear dependency between a $4^{th}$ and a $6^{th}$ drive gear.

The single gear dependency allows for larger ranges of gear ratios without increasing the size of the dual-clutch gearbox.

In one embodiment of the dual-clutch seven speed transmission arrangement for use with a transverse engine arrangement in a hybrid vehicle, said dual-clutch gearbox comprises a double gear dependency between a $3^{rd}$ and a $5^{th}$ drive gear and a $4^{th}$ and a $6^{th}$ drive gear.

Some of the advantages in one embodiment of the present disclosure can be accomplished without the single gear dependency. However, it should be noted that some improvements in relation to some embodiments of the present disclosure require the single gear dependency. The solution that comprises dual gear dependencies provides the benefits of dual output shafts where the gear drives are divided in the aforementioned way without providing the additional benefit of single gear dependency. This means that some objects of the disclosure can be achieved also with dual gear dependency.

In one embodiment of the dual-clutch seven speed transmission arrangement for use with a transverse engine arrangement in a hybrid vehicle, said transverse engine arrangement comprises an internal combustion engine wherein disengagement of both clutches disengages the internal combustion engine from a power train of said hybrid vehicle.

One embodiment of the disclosure presents the advantage that the hybrid vehicle can be propelled by the internal combustion engine, the electrical motor, or a combination thereof.

In another embodiment of the disclosure both clutches might be disengaged which completely disconnects the internal combustion engine from the rest of the drive train.

In one embodiment of the dual-clutch seven speed transmission arrangement for use with a transverse engine arrangement in a hybrid vehicle, said electrical motor in an operational state provides power to the drive train through said input shaft for even drive gears, and said input shaft for even drive gears can be switched between the even gears and reverse without intervention of the internal combustion engine.

The dual-clutch arrangement enables that the electrical motor can be used either stand alone or in combination with the internal combustion engine. The arrangement of drive gears wherein the electrical motor is attached to one of the input shafts also enables for the electrical motor to utilize the different gears of that input shaft. In one embodiment of the disclosure the electric motor can thereby utilize all the even drive gears in the dual-clutch gearbox. Additionally, in one embodiment the internal combustion engine could utilize the odd drive gears simultaneously as the electrical motor utilizes the even drive gears.

In one embodiment of the dual-clutch seven speed transmission arrangement for use with a transverse engine arrangement in a hybrid vehicle, said electrical motor is arranged to provide power to the front wheels of said hybrid vehicle.

The compact size of the dual-clutch gearbox makes it suitable to be arranged in vehicles with front wheel drive or in general vehicles with transversal engine installation.

In one embodiment of the dual-clutch seven speed transmission arrangement for use with a transverse engine arrangement in a hybrid vehicle, said electrical motor is connected to the $4^{th}$ drive gear of the input shaft.

In one embodiment of the dual-clutch seven speed transmission arrangement the electrical motor is connected to the $4^{th}$ drive gear. It is also understood that the $4^{th}$ gear can be dependent to another gear of the dual-clutch gearbox, preferably the $6^{th}$ gear.

In one embodiment of the dual-clutch seven speed transmission arrangement for use with a transverse engine arrangement in a hybrid vehicle, the dual-clutch seven speed transmission arrangement comprises a disconnection function between said electrical motor and the transverse engine arrangement.

In one state of an embodiment the hybrid vehicle can be propelled by solely the electric motor. In another, the electric motor could be disengaged in order to enable propulsion solely from the internal combustion engine.

In one embodiment of the dual-clutch seven speed transmission arrangement for use with a transverse engine arrangement in a hybrid vehicle, said electrical motor is connected to a $4^{th}$ drive gear via a transfer gear set comprised of a chain, a belt, or a set of gears.

The electric motor is in one embodiment connected to the $4^{th}$ drive gear via a transfer gear set which may be any form of engaging mechanical means that can transfer movement between said electric motor and the dual-clutch gearbox.

According to another aspect of the disclosure a method is provided in a dual-clutch seven speed transmission arrangement for use with a transverse engine arrangement in a hybrid vehicle, wherein a dual-clutch gearbox comprises an input shaft for odd drive gears and an input shaft for even drive gears, respectively arranged in connection to a first and a second clutch. The input shaft for even drive gears is a hollow shaft enclosing said input shaft for odd drive gears and the input shaft for odd drive gears is arranged to host four odd drive gears, and said input shaft for even drive gears is arranged to host three even drive gears and a reverse drive gear.

The method comprises the steps of:

disengaging an internal combustion engine from the drive train by means of disengaging both clutches in said compact dual-clutch seven speed transmission arrangement, engaging power from an electrical motor attached to the $4^{th}$ drive gear of said input shaft for even drive gears, and switching between different drive gears of said input shaft for even drive gears without the intervention of said internal combustion engine or said clutches.

According to another embodiment of the disclosure a method where a dual-clutch seven speed transmission arrangement for use with a transverse engine arrangement in a hybrid vehicle is provided wherein said electrical motor provides power to the front wheels of said hybrid vehicle.

According to another embodiment of the disclosure a method in a dual-clutch seven speed transmission arrangement for use with a transverse engine arrangement in a hybrid vehicle is provided, wherein said dual-clutch gearbox comprises a single gear dependency between a $4^{th}$ and $6^{th}$ drive gear.

According to another embodiment of the disclosure a method in a dual-clutch seven speed transmission arrangement for use with a transverse engine arrangement in a hybrid vehicle is provided, wherein said dual-clutch gearbox comprises a double gear dependency between a $3^{rd}$ and a $5^{th}$ drive gear and a $4^{th}$ and a $6^{th}$ drive gear.

BRIEF DESCRIPTION OF THE DRAWINGS

Example embodiments according to the disclosure are now described with reference to the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the following, a detailed description of different embodiments of the disclosure is disclosed with reference to the accompanying drawings. All examples herein should be seen as part of the general description and are therefore possible to combine in any way in general terms. Individual features of the various embodiments and methods may be combined or exchanged unless such combination or exchange is clearly contradictory to the overall function of the dual-clutch seven speed transmission arrangement.

Briefly described, the disclosure relates to a compact dual-clutch seven speed transmission arrangement for use within a hybrid vehicle. The transmission arrangement comprises a dual-clutch gearbox and an electrical motor coupled to the $4^{th}$ gear of the transmission. Thereby the transmission arrangement allows for propulsion from both an internal combustion engine and the electric motor. The transmission further allows for propulsion from both engines to be sent to the drive train simultaneously in order for the hybrid vehicle to gain propulsion from both power sources.

Figure 1:
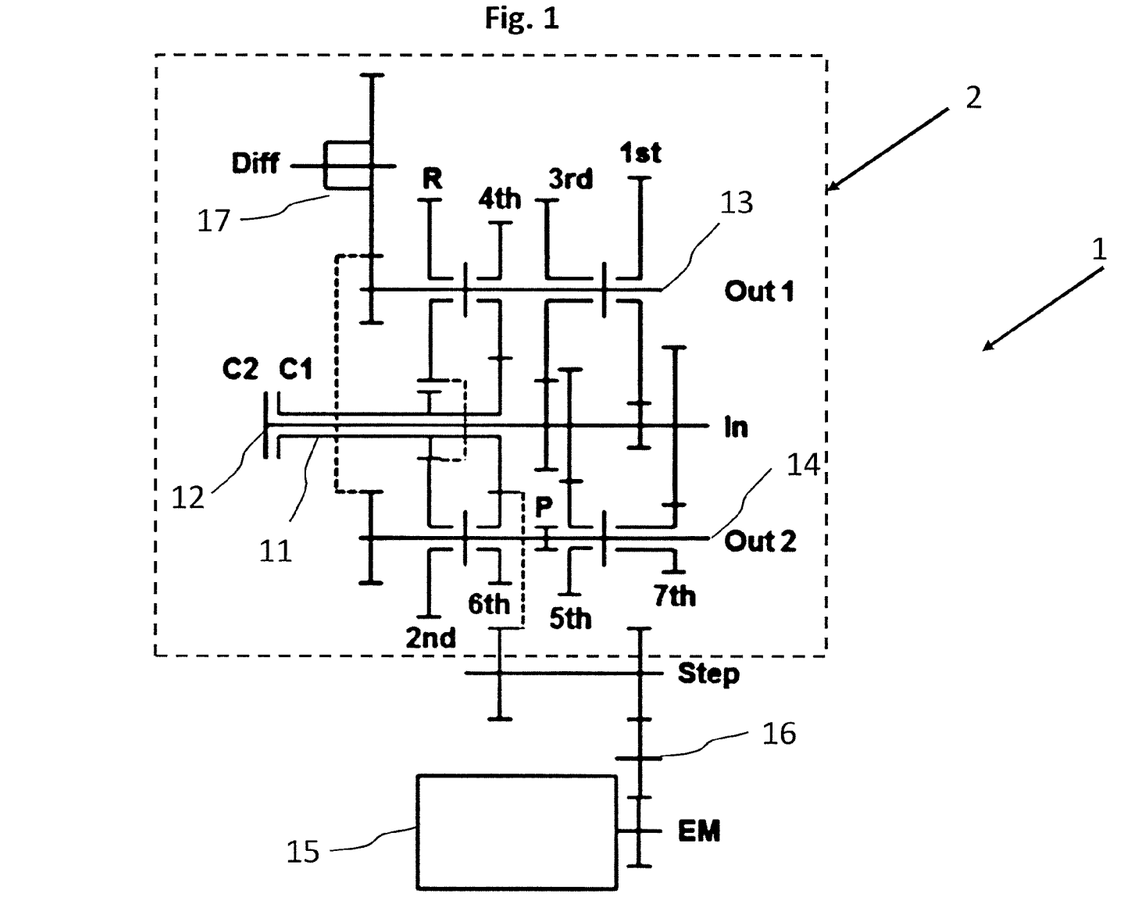
FIG. 1 illustrates a first embodiment of the dual-clutch seven speed transmission arrangement comprising a dual-clutch gearbox with single gear dependency.

In FIG. 1, a first embodiment of the disclosure is illustrated in the form of a chart visualizing the different parts of a compact dual-clutch seven speed transmission arrangement 1. The compact dual-clutch seven speed transmission arrangement 1 comprises a dual-clutch gearbox 2 which comprises two input shafts 11, 12, coupled to two clutches C1, C2 that are arranged to engage and disengage in relation to an internal combustion engine (not shown). The two input shafts 11, 12 are: one input shaft 11 for even drive gears and one input shaft 12 for odd drive gears where the input shaft 11 for even drive gears is a hollow input shaft that within comprises the input shaft 12 for odd drive gears. The dual-clutch gearbox 2 further comprises a first 13 and a second 14 output shaft arranged to engage with the drive gears 31, 41. The first output shaft 13 is arranged to engage with any of the $1^{st}$, $3^{rd}$, $4^{th}$, or reverse gears while the second output shaft 14 is arranged to engage with any of the $2^{nd}$, $5^{th}$, $6^{th}$, or $7^{th}$ gears.

FIG. 1 further illustrates the electrical motor 15 which is attached through engaging means 16 to the $4^{th}$ gear of the gearbox 2. A differential 17 is arranged in connection to both the first output shaft 13 and the second output shaft 14 and is arranged to provide power through the remaining parts of the drive train and propulsion to the wheels.

Dividing the gears between an input shaft 11 for even drive gears 41 and an input shaft 12 for odd drive gears 31 presents multiple benefits for the dual-clutch gearbox 2. Dual-clutch gearboxes 2 rely for their rapid gear changes on predicting which gear 31, 41 that will be the next to engage. Rapid gear changes are normally required during quick and continuous accelerations, such as when trying to achieve a 0-100 KPH time. That means that the gear 31, 41 that most likely needs to be engaged as the next gear in relation to a rapid gear change is the next gear in line from 1-7. By dividing the gears 31, 41 between an input shaft 11 for even drive gears 41 and an input shaft 12 for odd drive gears 31 and arranging those in connection to a first clutch C1 and second clutch C2, respectively, it is possible to always keep the next gear preloaded at the clutch currently disengaged.

In one example embodiment the first clutch C1 is engaged and provides propulsion from the internal combustion engine through any of the odd drive gears 31 to the differential 17. The second clutch C2 is disengaged, which means that no connection is established between the internal combustion engine (not shown) and the input shaft 11 for even drive gears 41. The input shaft 11 for even drive gears 41 is instead engaged with the electrical motor 15 and provides propulsion through any of the even drive gears 41 to the differential 17. This means that propulsion is provided from both the internal combustion engine and the electric motor 15.

Figure 2:
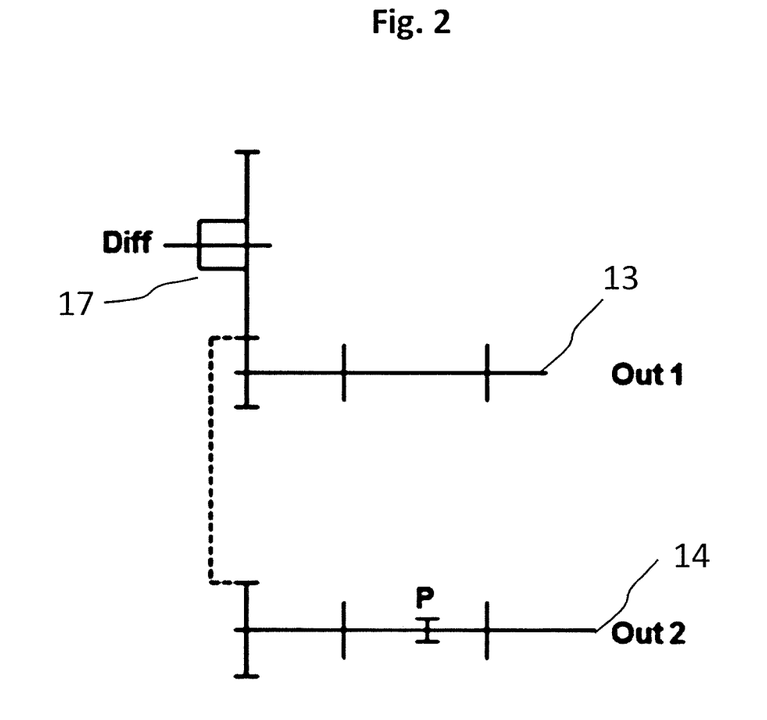
FIG. 2 illustrates the output shafts of the dual-clutch seven speed gearbox with single gear dependency.

In FIG. 2 the first 13 and second 14 output shafts are illustrated in a separate view together with the differential 17. FIG. 2 thereby illustrates parts of the compact dual-clutch seven speed transmission that are always in connection with each other independent on which gear that is currently engaged.

Figure 3:
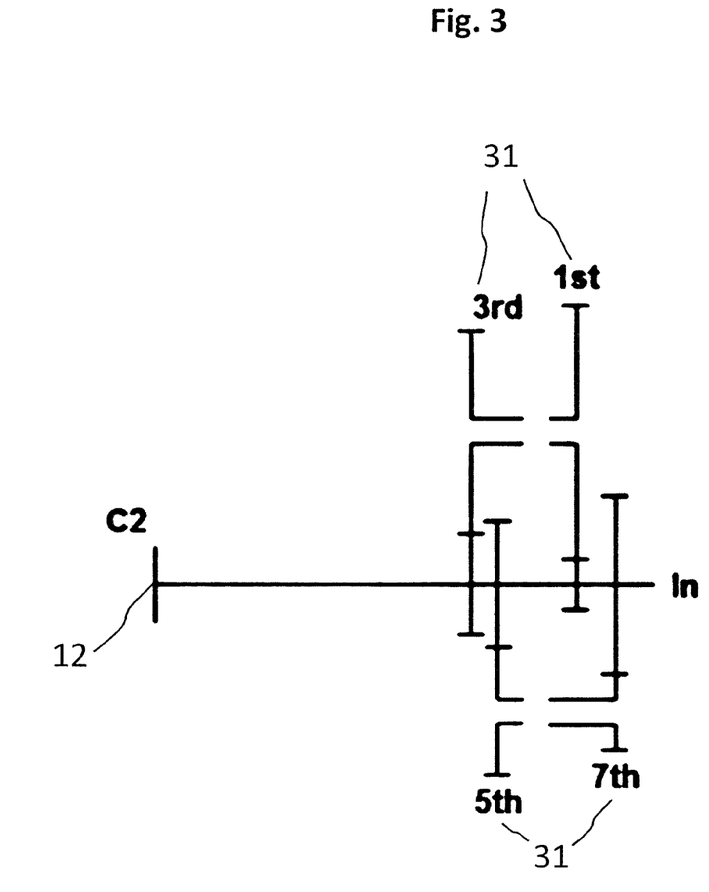
FIG. 3 illustrates the input shaft for odd drive gears of the dual-clutch seven speed gearbox with single gear dependency.

In FIG. 3 the input shaft 12 for odd drive gears 31 is shown together with the odd drive gears 31 for gears 1, 3, 5, and 7. The odd drive gears 31 in FIG. 3 are all independent from each other meaning that no dependencies exist between any gears 31 of the input shaft 12. The odd drive gears 31 can thereby be changed independently depending on the desired gear ratio. At the end of the input shaft 12 for odd drive gears 31 is one of the clutch C2 arranged which engages and disengages power from the internal combustion engine.

Figure 4:
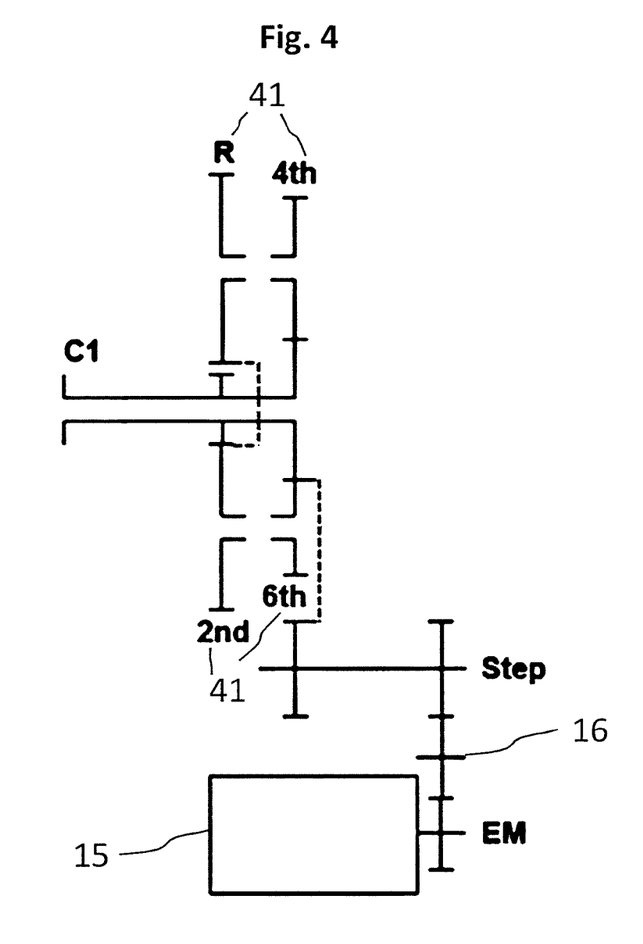
FIG. 4 illustrates the input shaft for even drive gears in the dual-clutch seven speed gearbox and the connection to the electric motor of the dual-clutch seven speed transmission arrangement for a hybrid vehicle.

In FIG. 4 part of the dual-clutch transmission arrangement 1 is illustrated comprising the electrical motor 15 connected to the input shaft 11 for even drive gears 41 of the dual-clutch gearbox 2. The electric motor 15 is connected through engaging means 16 which in different embodiments of the disclosure could be for example drive gears, belts, chains, or any other form of engaging means. The drive gears for even gears 41 comprise a dependency between the 4$^{th}$ gear and the 6$^{th}$ gear and those gears can thereby in one embodiment of the disclosure not be changed without changing the ratio of the other gear simultaneously.

It is understood that the electric motor 15 in different embodiments could be coupled, and thereby dependent, to any of the even drive gears 41.

Figure 5:
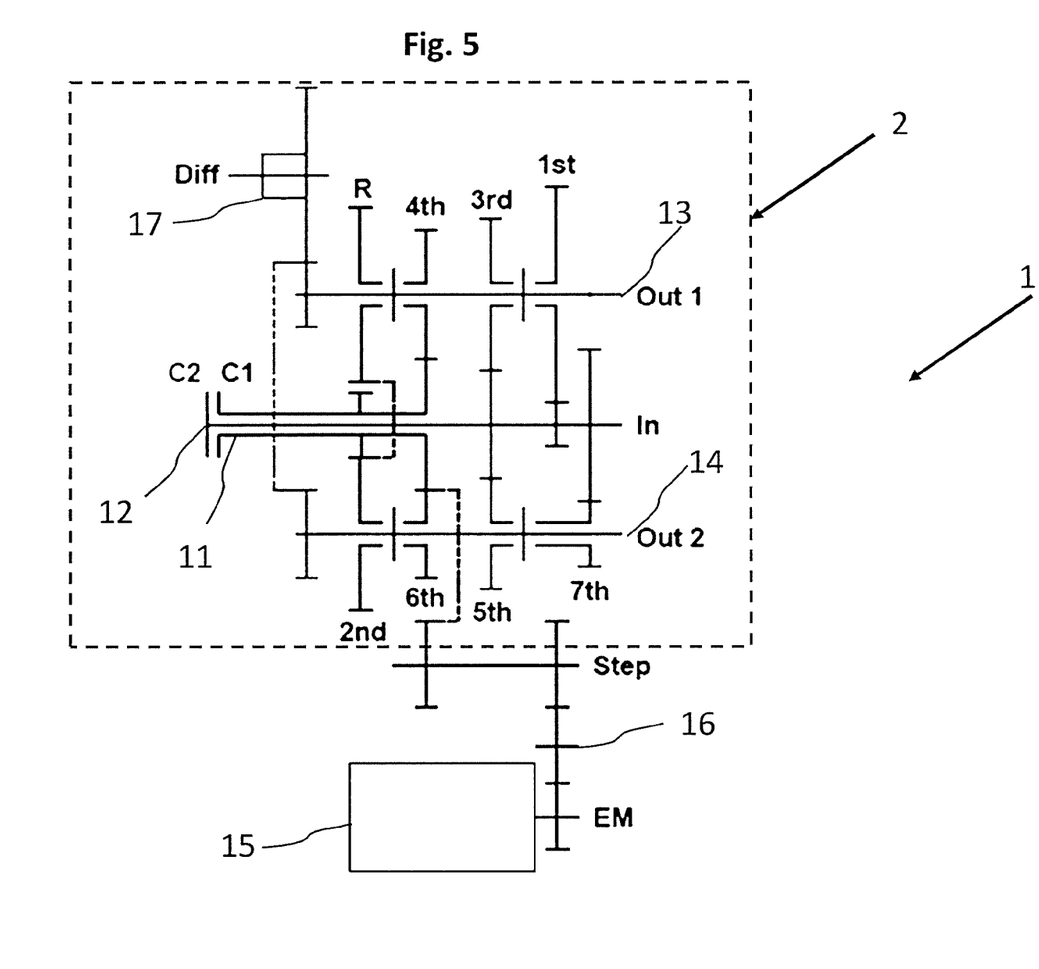
FIG. 5 illustrates a second embodiment of the dual-clutch seven speed transmission arrangement comprising a gearbox with dual gear dependency.

In FIG. 5 a second embodiment of the dual-clutch transmission arrangement 1 is shown comprising a dual-clutch gearbox 2. The dual-clutch gearbox 2 according to said second embodiment comprises dual gear dependencies but is otherwise identical to the aforementioned first embodiment described in FIG. 1.

Figure 6:
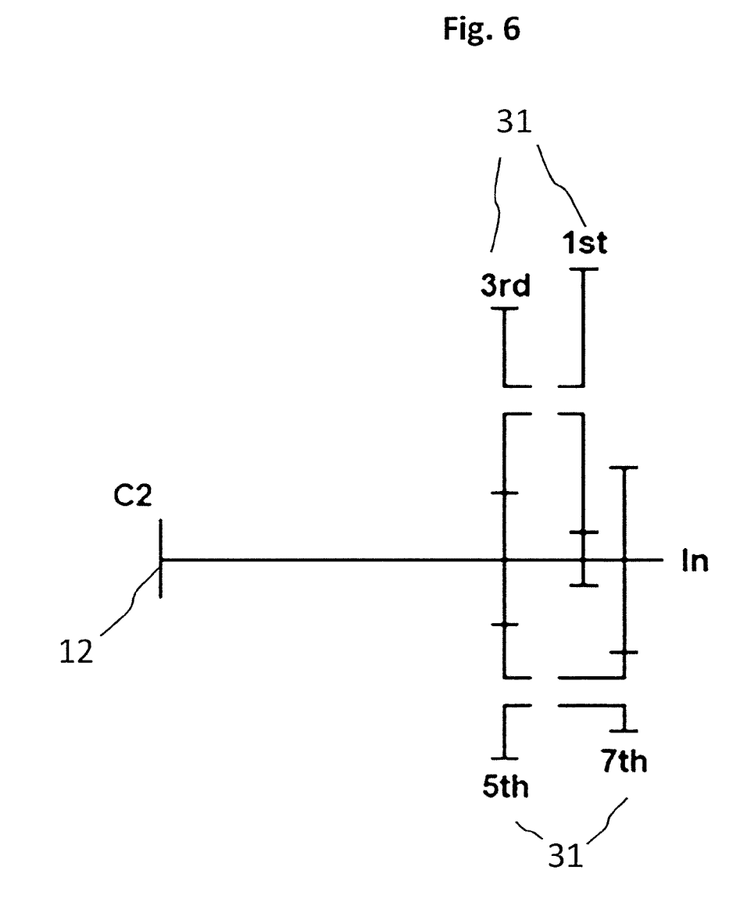
FIG. 6 illustrates the input shaft for odd drive gears of the dual-clutch seven speed gearbox with dual gear dependency.

In FIG. 6 the dual gear dependencies of said second embodiment are illustrated. It should be noted that it is only the input shaft 12 for odd drive gears 31 that is different between those two embodiments and thereby FIGS. 4 and 2 comply with both embodiments.

It should be noted that the electric motor 15 could, in any of the aforementioned embodiment as long as not contradictory to any previous stated feature, be engaged to the transmission arrangement for the purpose of operating as a generator.

The detailed description above, any embodiment, or feature of an embodiment, are only examples and could be combined in any way if such combination is not clearly contradictory.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A dual-clutch seven speed transmission arrangement for use with a transverse engine arrangement in a hybrid vehicle, the dual-clutch seven speed transmission arrangement comprising:
   a dual-clutch gearbox including an input shaft for odd drive gears and an input shaft for even drive gears respectively arranged in connection to a first clutch and a second clutch, wherein the input shaft for even drive gears is a hollow shaft enclosing the input shaft for odd drive gears, the input shaft for odd drive gears is arranged to host four odd drive gears and the input shaft for even drive gears is arranged to host three even drive gears and a reverse drive gear; and
   an electric motor directly connected to a 4th drive gear associated with the input shaft for even drive gears via a transfer gear set including a chain, a belt, or a set of gears.

2. The dual-clutch seven speed transmission arrangement according to claim 1 wherein the input shaft for odd drive gears comprises drive gears for gears 1, 3, 5 and 7, and the input shaft for even drive gears comprises drive gears for gears 2, 4, 6 and reverse.

3. The dual-clutch seven speed transmission arrangement according to claim 2 wherein the dual-clutch gearbox further comprises a first output shaft and second output shaft, wherein the first output shaft is arranged to engage any of gears 1, 3, 4 and reverse, while the second output shaft is arranged to engage any of gears 2, 5, 6 and 7.

4. The dual-clutch seven speed transmission arrangement according to claim 1 wherein the dual-clutch gearbox further comprises a first output shaft and second output shaft, wherein the first output shaft comprises drive gears for gears 1, 3, 4 and reverse, while the second output shaft comprises drive gears for gears 2, 5, 6 and 7.

5. The dual-clutch seven speed transmission arrangement according to claim 1 wherein the dual-clutch gearbox comprises a single gear dependency between the 4th drive gear and a 6th drive gear.

6. The dual-clutch seven speed transmission arrangement according to claim 2 wherein the dual-clutch gearbox comprises a single gear dependency between the 4th drive gear and the 6th drive gear.

7. The dual-clutch seven speed transmission arrangement according to claim 1 wherein the dual-clutch gearbox comprises a double gear dependency between 3rd and 5th drive gears and 4th and 6th drive gears.

8. The dual-clutch seven speed transmission arrangement according to claim 1 wherein the transverse engine arrangement comprises an internal combustion engine, and wherein the dual-clutch seven speed transmission arrangement is configured such that disengagement of both clutches disengages the internal combustion engine from a drive train of the hybrid vehicle.

9. The dual-clutch seven speed transmission arrangement according to claim 8 wherein the electric motor in an operational state is configured to provide power to the drive train through the input shaft for even drive gears, and the input shaft for even drive gears can be switched between the even gears and reverse without intervention of the internal combustion engine.

10. The dual-clutch seven speed transmission arrangement according to claim 1 wherein the electric motor is arranged to provide power to front wheels of the hybrid vehicle.

11. The dual-clutch seven speed transmission arrangement according to claim 1 further comprising a disconnection function arrangeable between the electric motor and the transverse engine arrangement.

12. A method for operating a dual-clutch seven speed transmission arrangement for use with a transverse engine arrangement in a hybrid vehicle, wherein the dual-clutch seven speed transmission arrangement includes a dual-clutch gearbox comprising an input shaft for odd drive gears and an input shaft for even drive gears respectively arranged in connection to a first clutch and a second clutch, the input shaft for even drive gears is a hollow shaft enclosing the input shaft for odd drive gears, the input shaft for odd drive gears is arranged to host four odd drive gears and the input shaft for even drive gears is arranged to host three even drive gears and a reverse drive gear, the method comprising:
   disengaging an internal combustion engine from a drive train by disengaging both clutches in the dual-clutch seven speed transmission arrangement;
   engaging power from an electric motor that is directly attached to a 4th drive gear of the input shaft for even drive gears via a transfer gear set including a chain, a belt, or a set of gears; and
   switching between different drive gears of the input shaft for even drive gears without intervention of the internal combustion engine or the clutches.

13. The method according to claim 12 wherein the electric motor provides power to front wheels of the hybrid vehicle.

14. The method according to claim 12 wherein the dual-clutch gearbox comprises a single gear dependency between the 4th drive gear and a 6th drive gear.

15. The method according to claim 12 wherein the dual-clutch gearbox comprises a double gear dependency between 3rd and 5th drive gears and the 4th and a 6th drive gears.

* * * * *